July 28, 1942.  E. N. JACOBI  2,291,159
AUTOMOBILE DIRECTION SIGNAL
Filed Feb. 20, 1939  4 Sheets-Sheet 1
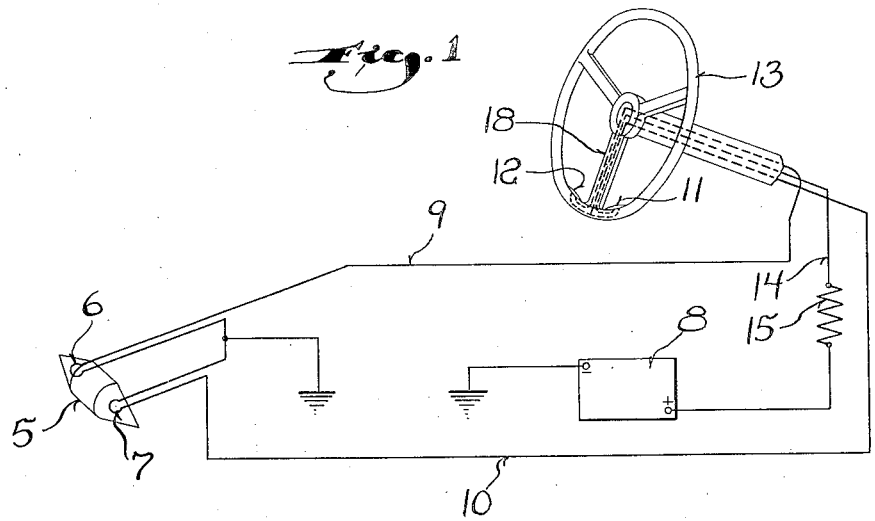
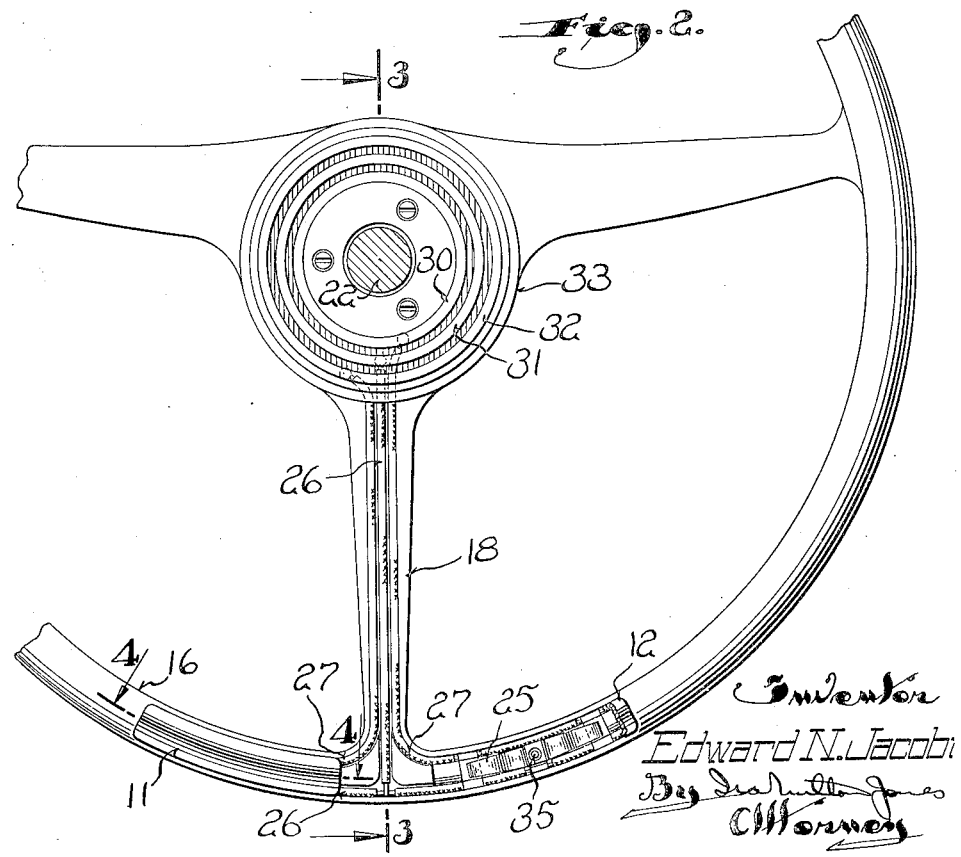
Inventor
Edward N. Jacobi July 28, 1942.   E. N. JACOBI   2,291,159
AUTOMOBILE DIRECTION SIGNAL
Filed Feb. 20, 1939   4 Sheets-Sheet 2
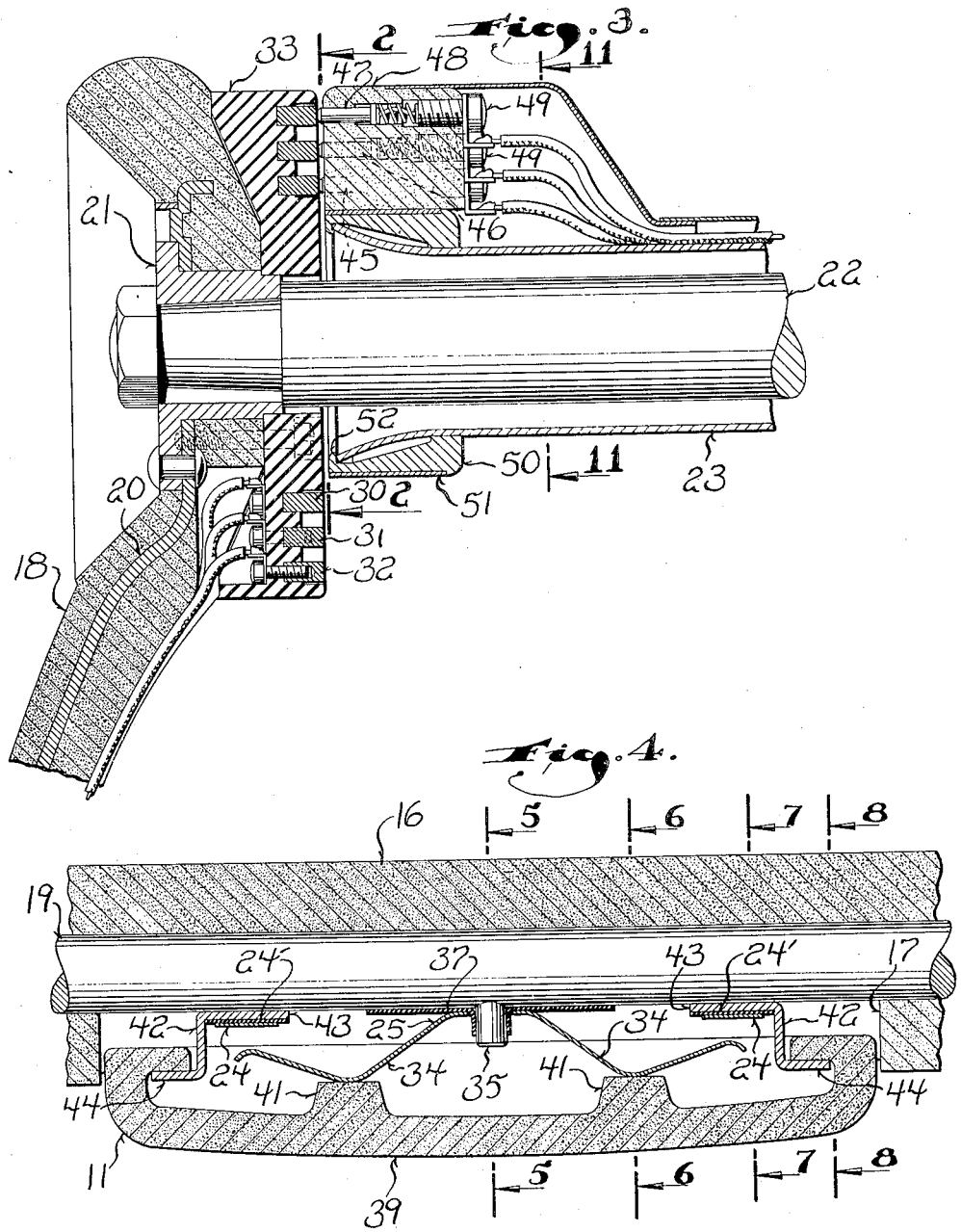
Inventor
Edward N. Jacobi July 28, 1942. E. N. JACOBI 2,291,159
AUTOMOBILE DIRECTION SIGNAL
Filed Feb. 20, 1939 4 Sheets-Sheet 3
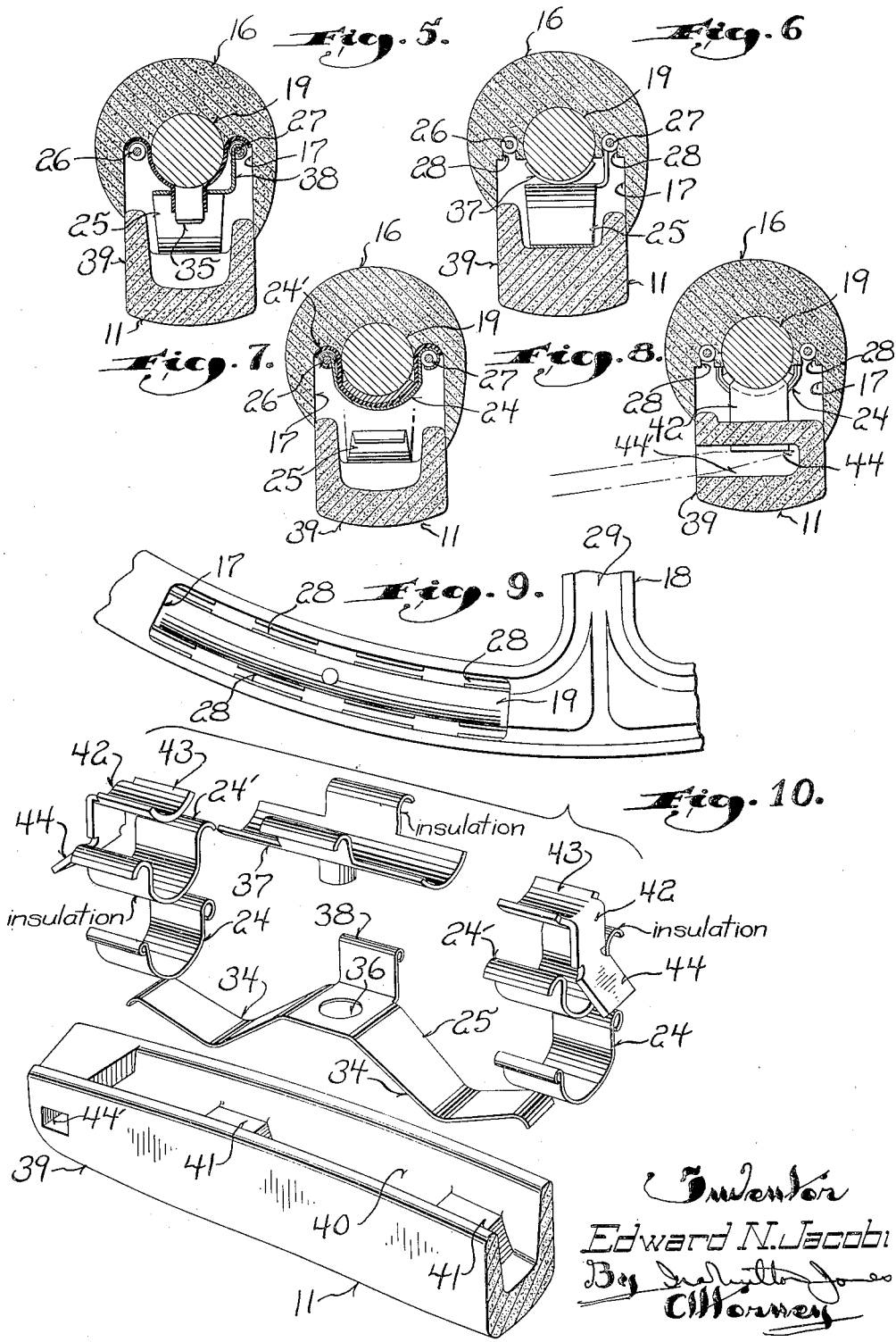
Inventor
Edward N. Jacobi

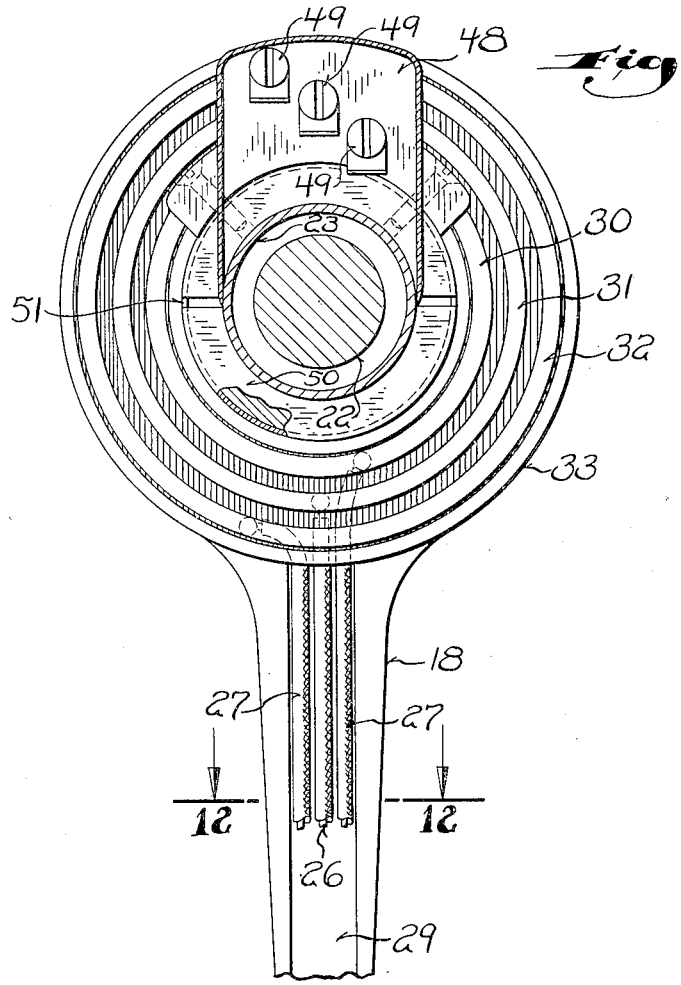
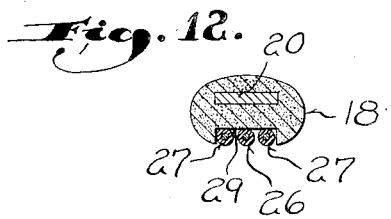
Inventor
Edward N. Jacobi
By
Attorneys

Patented July 28, 1942

2,291,159

UNITED STATES PATENT OFFICE 2,291,159

AUTOMOBILE DIRECTION SIGNAL

Edward N. Jacobi, Milwaukee, Wis., assignor to Briggs & Stratton Corporation, Milwaukee, Wis., a corporation of Delaware Application February 20, 1939, Serial No. 257,436

14 Claims. (Cl. 200—59)

This invention relates to automobile direction signals, and refers particularly to a "right" and "left" turn signal usually mounted on the back of an automobile and controlled by the driver to indicate the intended direction of travel.

In general, the invention consists in the provision of two electrically lighted signals on the rear of the automobile and electric circuits for lighting these signals upon closure of switches mounted on the steering wheel, and one of the objects of this invention is to provide a novel and improved switch construction so designed that the switch will be closed without conscious effort on the part of the driver and without distracting his attention in any way.

Another object is to enable the operator of a vehicle equipped with this invention to signal a turn in advance of the actual change in direction of the vehicle merely by changing his grip on the steering wheel preparatory to turning.

More specifically, it is an object of this invention to provide switches in the rim of an automobile steering wheel which are closed by griplike actuators having portions thereof projecting slightly beyond the surface of the rim at points not usually gripped by the driver during normal forward travel of the automobile.

Another object of this invention is to provide switch devices of the character described which are compact in design and readily built into the rim of a steering wheel without in anywise increasing its cross sectional area or without resulting in a bulky awkward construction.

Another object of this invention is to provide a signal device for automobiles to designate "right" and "left" turns, which incorporates means for cancelling both signals in the event the driver unintentionally closes both of the controlling switches.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a diagrammatic view illustrating the complete signal system;

Figure 2 is a bottom view of a portion of the steering wheel, with part of one of the switch actuators broken away;

Figure 3 is an enlarged sectional view through the steering wheel and the adjacent portion of the steering post, taken on the plane of the line 3—3 in Figure 2;

Figure 4 is a sectional view through one of the switches taken on the plane of the line 4—4 in Figure 2;

Figure 5 is a cross sectional view through Figure 4 on the plane of the line 5—5;

Figure 6 is a cross sectional view through Figure 4 on the plane of the line 6—6;

Figure 7 is a cross sectional view through Figure 4 on the plane of the line 7—7;

Figure 8 is a cross sectional view through Figure 4 on the plane of the line 8—8;

Figure 9 is a fragmentary view of the steering wheel rim showing the cavity therein for the reception of the switch, but with the switch removed;

Figure 10 is a perspective view of the various parts of the switch shown disassembled but in their proper order of assembly;

Figure 11 is a cross sectional view taken through Figure 3 on the plane of the line 11—11; and Figure 12 is a detail sectional view taken through Figure 11 on the plane of the line 12—12.

Referring now particularly to the accompanying drawings in which like numerals indicate like parts throughout the several views, the numeral 5 designates a "right" and "left" turn signal of the type adapted to be mounted on the rear of an automobile. The signal is rendered operative by the illumination of either of two electric lamps 6 and 7, the former being lighted to designate a "left" turn, and the latter being lighted to designate a "right" turn.

These lamps are connectible with the battery 8 of the automobile through circuits 9 and 10 upon closure of "right" and "left" switches 11 and 12, respectively, mounted in the rim of the steering wheel 13. The two circuits 9 and 10 have a common return lead 14 in which a thermoelectric ballast resistor 15 is connected.

This ballast resistor is wound with iron wire and has such electrical characteristics that the current flowing in one of the circuits to light one of the signal lamps does not materially alter its resistance so that when only one circuit is closed by actuation of its respective switch, the resistor has no effect.

However, the increased current flowing through the resistor in consequence to simultaneous closure of both switches quickly increases its resistance to the point where the current flowing in both circuits is limited to an extent preventing the lighting of the signal lamps 6 and 7. Hence, the ballast resistor functions to cancel both signals in the event the driver should unintentionally close both switches 11 and 12.

The specific construction of the switches forms a vital part of this invention, and makes the control of the signal more practical as it enables the driver to render the proper signal operative without conscious effort, and as a mere incident to normal driving practice.

This follows from the fact that the switches are mounted in the rim of the steering wheel, and to this end, the nonmetallic outer body 16 of the steering wheel rim has two cavities 17, one on each side of the normally vertical or downwardly extending spoke 18 of the steering wheel.

The rim of the steering wheel, as is customary, is reinforced by a steel ring 19 embedded in the body 16, and the spokes are likewise reinforced by metal cores 20 secured to the ring at their outer ends and to a metal hub 21 at their inner ends. The metal hub 21 provides means whereby the steering wheel is secured to the steering rod 22 which is enclosed in the hollow post 23.

Each switch consists of one or more, and preferably two, stationary contacts 24 and a movable contactor 25. The stationary contacts 24 are in the form of U-shaped clips which embrace the portion of the rim core 19 exposed by the bottom of the cavity 17 but are insulated therefrom by insulation 24'. They are held in place by the conductor wires 26 and 27 by which the stationary contacts and the movable contactor, respectively, are connected with the controlling circuits.

These conductors are of relatively stiff heavy wire properly insulated, and as best shown in Figure 6, are secured in position in the rim of the wheel by being wedged down into grooves 28 in the bottom of the cavity 17. The mouths of these grooves 28 are preferably slightly narrower than the diameter of the insulated wires so that the wires must be forced into position, and after being forced down into place, they may be positively secured against displacement by closing the mouths of the grooves 28 by a suitable plastic, although ordinarily this is unnecessary. As shown in Figure 9, there is a number of such grooves 28 at each side of the metal core 19.

The conductor 26, which leads to the stationary contacts to which it is electrically connected by having the insulation removed and the bared wire gripped by the adjacent ends of the stationary contacts, is common to both of the two switches, as clearly shown in Figure 2, but a separate conductor 27 is provided for each switch. These conductors are electrically joined to the movable contactors 25 of their respective switches by having a portion of the contactors grip a bared part of the conductor, as specifically shown in Figure 5.

There are thus three conductors coming from the two switches, and these are embedded in a groove 29 in the spoke 18 to be electrically connected with metal collector rings 30, 31 and 32 embedded in an insulated hub 33 secured to the hub of the wheel proper.

The inner ring 30 has the conductor 27 of the "left" switch 12 connected therewith. The outer ring 32 has the conductor 27 of the "right" switch 11 connected therewith; and the center ring 31 has the common conductor 26 connected therewith. The manner in which the collector rings 30, 31 and 32 are connected with the circuits 9 and 10 will be described hereinafter.

Returning to the specific construction of the switches, it will be seen that each contactor 25 is in the form of a yoke having oppositely extending spring arms 34, the outer ends of which are shaped to be depressed into contact with the stationary contacts 24. The contactor is held in proper alignment with the stationary contacts by a stud 35 welded or threaded into the metal core 19 of the rim and extending through a hole 36 in the central portion of the contactor. A suitably formed insulation guard 37 is interposed between the metal core 19 and the contactor 25.

As noted hereinbefore, the contactor is electrically connected with the conductor 26, this being effected by having a part 38 thereof extending inwardly and curled about the adjacent bared portion of the conductor.

The spring tension of the arms 34 is such as to maintain the extremities thereof spaced from the stationary contacts 24, and to depress the same into contact therewith, an actuator 39 is provided.

This actuator may be formed of the same molded plastic material as the body 16 of the steering wheel rim and substantially closes the mouth of the cavity 17. Its inner surface is recessed, as at 40, to receive the arms 34 of the contactor, and abutments 41 on the actuator are positioned to engage and depress the contactor arms.

The actuator is held assembled with the rim of the steering wheel by retaining clips 42 having curved portions 43 confined between the metal core 19 and the insulation 24', which insulates the stationary contacts from the core. When these retaining clips are first assembled with the stationary contacts and the core, their outer ends 44 are inclined, as shown in Figure 10. In this position, the distance between the extremities of the clip portions 44 is less than the overall length of the recess 40 in the actuator so that the actuator may be inserted into the cavity 17.

With the parts properly positioned in this manner, the end portions 44 are pressed down by a proper tool insertable into the cavity 40 through an opening 44' in the side of the actuator, as illustrated in Figure 8, so that thereafter, the portions 44 constitute stops to limit the outward motion of the actuator produced by the spring tension of the contactor arms.

The collector rings 30, 31 and 32 are electrically connected with the circuits 9 and 10 by spring pressed plunger-like contactors 45, 46 and 47, respectively, all of which are mounted in an insulated head 48 mounted on the tubular steering post 23. The plunger-like contactors 45, 46 and 47 are slidable in appropriate wells formed in the insulated head 48 and are yieldingly projected into engagement with their respective collector rings by springs confined between them and screw terminals 49 to which the conductors of the circuits 9 and 10 are connected.

The insulated head 48 is secured to a ring 50 mounted on the upper end of the tubular steering post. This ring is in two separable halves held together by a metal band 51 to permit the same to be applied over the outer flared end of the steering post with a rim portion 52 engaging the extremity thereof to hold it against shifting.

From the foregoing description taken in connection with the accompanying drawings, it will be readily apparent that this invention provides a novel and highly practical direction signal system for automobiles, and that the manner in which the controlling switches are mounted makes the control of the signal more or less automatic by eliminating the necessity for conscious effort on the part of the driver. In addition, the location of the control switches insures the proper signal being given in advance of the actual change in direction of the vehicle.

What I claim as my invention is:

1. In a steering wheel having a rim including a metal core and a nonmetallic body encasing said core: said nonmetallic body having a cavity exposing a part of the metal core; a stationary contact of an electric switch embracing the exposed portion of the metal core but electrically insulated therefrom; a movable contactor in the cavity; means supported by the metal core for guiding the movable contactor in its motion toward and from engagement with the stationary contact; and an actuator for the movable contactor depressible into said cavity and substantially closing the mouth thereof.

2. In a steering wheel having a rim provided with an elongated arcuate cavity disposed along the arc of the rim: an electric switch in said cavity comprising, a stationary contact and a movable contactor; a hollow arcuate grip-like actuator for the movable contactor conforming to the outline of said cavity and disposed substantially flush with the mouth of the cavity, said actuator being depressible into the cavity; and means inside the cavity and extending into the hollow of the actuator, said means engaging the actuator to limit movement thereof away from the rim of the wheel so as to hold the actuator assembled with the wheel.

3. In a steering wheel having a rim provided with a circumferentially elongated arcuate cavity: an electric switch mounted in the cavity comprising, a plurality of complementary stationary and movable contacts; electric conductors inside the rim of the wheel for connecting said switch with an electric circuit; an actuator for manually closing said switch, said actuator having an arcuate grip-like shape corresponding to that of the cavity so as to substantially fill the mouth of the cavity, said actuator having a recess formed in its side adjacent to the cavity; and cooperating means carried by the rim of the wheel and the actuator and wholly enclosed by the rim and the actuator for limiting movement of the actuator away from the rim of the wheel to retain the same assembled with the rim, said rim carried means extending into the recess of the actuator to lie adjacent to said actuator carried means and being wholly contained within the cavity so as to hold the actuator partly projected into the mouth of the cavity with the actuator nearly flush in respect to the rim of the steering wheel.

4. In a steering wheel having a rim and a plurality of spokes, one of which is normally in a depending vertical position: the rim having two cavities in its underside adjacent to its junction with said spoke, one on each side thereof; electric switches mounted in said cavities; conductors fixedly embedded in the steering wheel rim and leading from said switches and along said spoke to the hub of the wheel, said conductors overlying portions of the switches to secure the switches in place in the cavities; and arcuate grip-like actuators for the movable contactors of the switches substantially closing the mouths of said cavities.

5. In a steering wheel having a rim provided with an open cavity: an electric switch in said cavity comprising, a stationary contact and a movable contactor; conductors for connecting said switch in an electric circuit, the stationary contact being electrically and mechanically connected with one of said conductors and the movable contactor being electrically and mechanically connected with another of said conductors; means for retaining said conductors in the bottom of the cavity, said conductors being relatively stiff so that their respective switch parts are retained in position in the cavity by the securement of the conductors therein; and an actuator for the movable contactor depressible into said cavity.

6. In a steering wheel having a rim provided with an arcuate cavity: an electric switch in said cavity comprising, a stationary contact and a movable contactor; stiff electrical conductors secured in the bottom of the cavity and having electrical and mechanical connection with said stationary contact and movable contactor to hold the same in the cavity; a retaining clip held in place by said conductors; an actuator for the movable contactor depressible into the cavity; and means on the actuator engageable with a portion of said retaining clip to limit outward movement of the actuator.

7. In a steering wheel having a rim provided with an arcuate cavity: an electric switch in said cavity comprising, a plurality of stationary contacts and a movable contactor; a stiff electric conductor secured in the rim of the wheel with portions thereof electrically and mechanically connected with the stationary contacts, whereby said stationary contacts are held in the cavity by said conductor; another stiff electric conductor secured in the rim of the wheel and having electrical and mechanical connection with the movable contactor, whereby the movable contactor is held in the cavity by its conductor; retaining clips held in the cavity by said conductors; an actuator for the movable contactor depressible into said cavity; and means on said actuator engageable with portions of the retaining clips to limit movement of the actuator outwardly of the cavity whereby said actuator is also retained in place by the conductors.

8. In a steering wheel having a rim provided with an arcuate cavity: a switch in said cavity including a stationary contact and a movable contactor; an actuator for the movable contactor depressible into the cavity; retaining clips secured in said cavity and having portions thereof engageable with the actuator to limit outward movement of the actuator and to retain the same assembled with the rim, the portions of the retaining clips engageable with the actuator being bendable into operative position after assembly of the actuator with the wheel rim.

9. In a steering wheel having a rim provided with an arcuate cavity: an electric switch in said cavity including a stationary contact and a movable contactor; an actuator for the movable contactor substantially closing the mouth of the cavity, said actuator having a recess in its underside to receive part of the contactor and having undercut ledges at the ends of said recess; retaining clips secured in the rim cavity with end portions thereof engageable with said ledges to limit movement of the actuator away from the rim, said end portions of the retaining clips being bendable into operative positions after assembly of the actuator with the rim; and said actuator having openings leading to the space adjacent to said ledges to enable the insertion of a tool for pressing the end portions of the clips into operative positions.

10. In combination with the steering wheel of an automotive vehicle: an electric switch embedded in the rim of the wheel and including a movable contactor; an actuator for the contactor, said actuator comprising a curved bar fitted into the rim of the wheel with a portion thereof exposed to be depressed, said curved bar being hollow at its side adjacent to the rim to receive portions of the contactor and completely concealing the entire switch structure; and conducting means fastened to the steering wheel to conduct electric current to and from the switch; and means connected between the actuator and said conducting means to hold said actuator in assembled relationship with the contactor.

11. A steering wheel switch of the type adapted to be embedded in a cavity in the rim of the wheel comprising: cooperating stationary and movable contacts in said cavity having portions adjacent to the bottom of the cavity; and substantially rigid electrical conductors fixed to said contacts with said portions of the contacts lying between the conductors and the bottom of the cavity, said cavity having slots in one wall near the bottom thereof extending circumferentially of the rim to receive said conductors with a substantially close fit for extended frictional engagement therewith to thereby secure the conductors in fixed positions in the cavity near the bottom thereof, said slots cooperating with the conductors whereby the conductors clamp said portions of the contacts against the bottom of the cavity to secure said contacts in place in the cavity.

12. A grip type switch for automotive vehicles having a steering wheel provided with an open cavity in the rim thereof comprising: stationary and movable contacts in said cavity, the stationary contact having a portion adjacent to the bottom of the cavity; substantially rigid electrical conductors fixed to said contacts so that said portion of the stationary contact lies between one of the conductors and the bottom of the cavity; said cavity having one wall near the bottom thereof formed with a slot providing spaced apart abutments between which said conductor overlying the stationary contact is frictionally received and which cooperate with said conductor to maintain said portion of the stationary contact clamped in place against the bottom of the cavity; an actuator for the movable contact movable into the cavity to depress the movable contact and engage it with the stationary contact when the actuator is gripped by the operator of the vehicle; and means in the cavity in fixed relationship with the stationary contact and engageable with portions of the actuator to limit outward movement of the actuator from the cavity.

13. A grip type switch mounted in a cavity in the rim of an automobile steering wheel and adapted to close a circuit when grasped at any point along its length comprising: a resilient movable contactor arm positioned in the cavity and supported adjacent to its middle by the rim of the wheel, said movable contactor having its free ends extending lengthwise of the rim of the wheel; stationary contacts engaged by the free ends of the movable contactor upon depression thereof; an actuator movable in said cavity and closing the open side thereof, said actuator overlying the movable contactor to provide an elongated grip for depressing the contactor and closing the switch; means for holding the stationary contacts in position at the bottom of the cavity; and means held in fixed position in the cavity by the stationary contacts and engageable with portions of the actuator to limit outward movement of said actuator from the cavity.

14. A grip type switch for automotive vehicles having a steering wheel provided with a cavity in the rim thereof comprising: a stationary and movable contact in said cavity each having a conductor fixed thereto; an actuator overlying the open side of the cavity for depressing the movable contactor into engagement with the stationary contact; a stop engageable with the actuator to limit movement of the actuator away from the cavity, said stop having a portion confined between said stationary contact and the bottom of the cavity; and means on one wall of the cavity for frictionally engaging the conductor of the stationary contact to secure said conductor, the stationary contact and said stop in place inside the cavity.

EDWARD N. JACOBI.